H. R. HUGHES.
ROLLER BORING DRILL.
APPLICATION FILED FEB. 10, 1913.
1,119,163.
Patented Dec. 1, 1914.
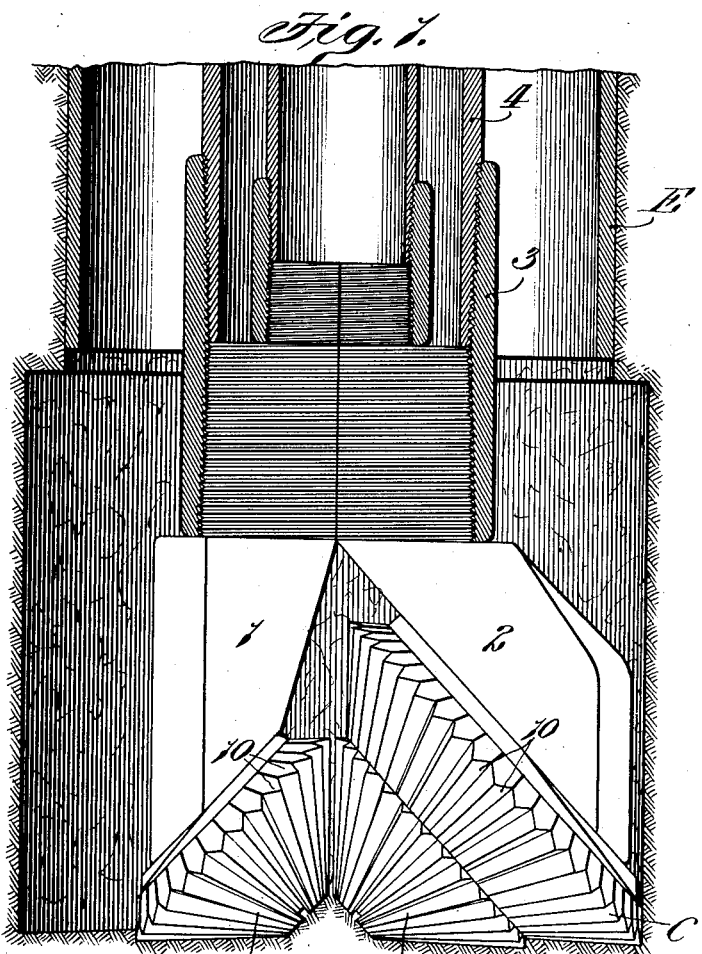
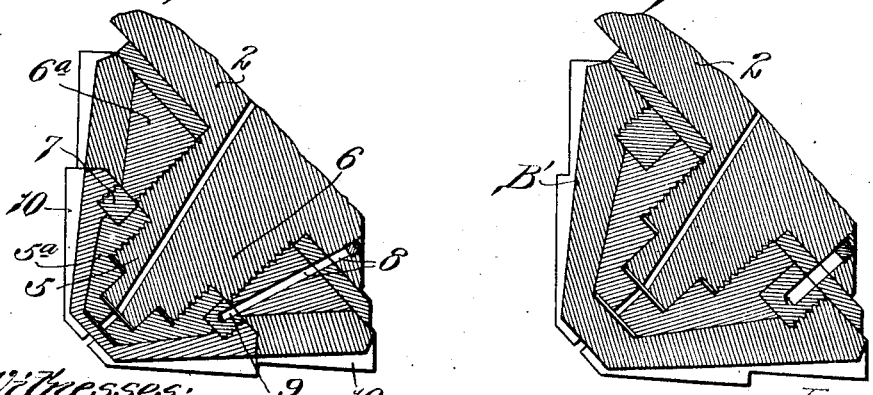
Witnesses:
Geo. P. Ladson
E. M. Badger
Inventor,
Howard R. Hughes.
By Bakewell & Church Attys.

UNITED STATES PATENT OFFICE.

HOWARD ROBARD HUGHES, OF HOUSTON, TEXAS.

ROLLER BORING-DRILL.

1,119,163.   Specification of Letters Patent.   Patented Dec. 1, 1914.

Application filed February 10, 1913. Serial No. 747,495.

*To all whom it may concern:*

Be it known that I, HOWARD R. HUGHES, a citizen of the United States, residing at Houston, Texas, have invented a certain new and useful Improvement in Roller Boring-Drills, of which the following is a full, clear, and exact description, such as will enable others skilled in the art to which it appertains to make and use the same.

This invention relates to boring drills of the type in which the cutting devices consist of rollers that are rotatably mounted on the head of the drill.

The main object of my present invention is to provide a roller boring drill which is so designed that it will drill a hole of much greater diameter than the extreme diameter of the drill head including the cutting rollers on said head which usually project laterally a slight distance from the head, thereby making it possible to drill a hole of greater diameter than the diameter of a well casing which is just large enough to permit the drill to be inserted in same.

Another object is to provide a roller drill having an eccentrically-disposed cutting roller or a roller which projects laterally some distance from one side of the head of the drill, said roller being so proportioned and arranged that it does not interfere with the operation of the main cutting rollers on the drill as its principal function is to maintain sufficient clearance at all times to insure a hole large enough for the casing to follow freely, thereby enabling the casing to be forced down into the hole progressively so as to prevent the walls of the hole from caving in. And still another object is to provide a roller drill having the characteristics above-mentioned that can be manufactured cheaply.

Other objects and desirable features of my invention will be hereinafter pointed out.

Figure 1 of the drawings is an elevational view of a roller drill constructed in accordance with my invention, a portion of the sleeve and the stem of the drill being in vertical section; Fig. 2 is a detail sectional view showing the way that the eccentrically-disposed cutting roller is mounted on the head; and Fig. 3 is a detail sectional view showing one of the main cutting rollers provided with an integral portion that constitutes an eccentrically-disposed cutting means.

I have herein shown my invention embodied in a roller boring drill of the type described in my prior Patent No. 979,496, dated December 27, 1910, but I do not wish it to be understood that the invention is limited to a drill of this type.

Referring to Figs. 1 and 2 of the drawings which illustrate the preferred form of my invention, 1 and 2 designate the two sections of the head of the drill which are clamped together by a sleeve 3 that secures the head to the tubular-shaped stem 4 of the drill. The drill is provided with a pair of main cutting rollers A and B which are approximately frusto-conical-shape, and said rollers are arranged diametrically opposite each other on spindles that project downwardly and inwardly toward the longitudinal center of the head so that they will form a hole that is concentric with the head. Said rollers can be secured on their supporting spindles in various ways as, for example, in the manner illustrated and described in my prior patent above referred to.

A third roller C, which I will refer to as an eccentrically-disposed cutting roller, is mounted on the head in such a manner that it acts on the material that surrounds the hole formed by the main cutting rollers A and B and thus enlarges or increases the diameter of said hole. The roller C is also approximately frusto-conical-shape and it is mounted behind one of the main cutting rollers, the roller B, at the base end of same, the small end of the roller C being of approximately the same diameter as the base end or large end of the main cutting roller B and having substantially the same taper as said roller B so that it practically forms a continuation of same, as shown in Fig. 1. By mounting the roller C in this manner I obtain a cutting surface at one side of the head which lies outside of the path of travel of the main cutting surfaces of the drill, thereby producing a drill in which the cutting surface at one side of the longitudinal axis of the head is greater than the cutting surface at the other side of the longitudinal axis. The inclined spindle 5 on which the main cutting roller B is mounted projects forwardly from a spindle 6 of greater diameter on which the roller C is mounted, said spindle 6 being provided with a removable cone-shaped portion 6$^a$ that forms a relatively large bearing surface for the roller C to turn on. The spindle 5 is also provided with a removable bearing surface 5$^a$ and the roller B is retained in position on said spindle by means of a ring 7 that is screwed into the inner end of the roller B. The head of the drill and the removable portion 6ª of the spindle 6 are provided with alining openings 8 so as to enable a tool, not shown, to be inserted in a notch or recess 9 in the ring 7 to hold said ring while the roller B is being screwed onto same, the roller B acting to lock the roller C in operative position on its supporting spindle.

A drill of the construction above-described can be inserted in a well casing E whose inner diameter is just great enough to receive the drill, or, in other words, is equal to the distance from the outer edge of the roller A to the outer edge of the roller C, but said drill will form a hole of much greater diameter than said casing owing to the fact that the distance from the longitudinal center of the head to the outer edge of the eccentrically-disposed roller C is greater than one-half the diameter of the well casing E. In other words, the diameter across the cutting surfaces of the three rollers A, B and C is about the same as the diameter of the well casing through which the drill is inserted, but said rollers are so disposed with relation to the longitudinal axis of the drill head that after the drill has been centered with reference to the casing it will cut a hole of greater diameter than the casing, this, of course, being due to the fact that the eccentric roller or laterally projecting roller C describes a circular path of greater diameter than the casing E.

A drill of the construction above-described will under-ream a hole into which a surface casing E has been inserted and thus enable the casing to be forced downwardly freely owing to the fact that the drill maintains sufficient clearance at all times to prevent the casing from binding or sticking in the hole even though the main cutting rollers become worn to such an extent that they lose their clearance. The drill is as strong and rigid as an ordinary drill of this type because all of the rollers are mounted on rigid and substantial spindles on the head of the drill and when the drill is equipped with a narrow roller C or one which adds slightly only to the cutting surface of the drill, the drill can be used as an ordinary drill and not as an under-reamer, the extra cutting roller C merely acting to maintain a liberal clearance at all times so that there is no possibility of the diameter of the hole becoming reduced to such an extent that it is not large enough to permit the surface casing to be forced down through same easily.

While I prefer to form the roller C separate and distinct from the roller B on account of the fact that it is cheaper to manufacture two rollers of the size shown than one large roller, still my invention is not limited to a drill in which the eccentrically-disposed cutting member is formed by a roller that is separate and distinct from the main roller arranged in front of same, for, if desired, one large roller could be used as shown in Fig. 3, said large roller being provided with a cutting portion B' that coöperates with the roller A to form a hole concentric with the drill head, and a cutting portion C' that performs the same function as the roller C shown in Fig. 1. It is also immaterial so far as my invention is concerned what particular kind of cutting surfaces the rollers are provided with, the cutting surfaces herein shown consisting of longitudinally-disposed chisel-teeth 10 on each roller which increase gradually in depth from the inner end of the roller outwardly, the inner end of the chisel-teeth of the roller C terminating at the outer end of the teeth of the roller B so that a shoulder will be formed at the junction of the two surfaces on which the rollers B and C operate.

Having thus described my invention, what I claim as new and desire to secure by Letters Patent is:

1. A boring drill comprising a head provided with approximately frusto-conical-shaped cutting rollers whose axes of rotation incline downwardly and inwardly toward the longitudinal center of the head and which are so arranged on the head that they will form a hole of greater diameter than the diameter across the cutting faces of said rollers.

2. A boring drill comprising a head provided with inclined frusto-conical-shaped cutting rollers which are so arranged that the area of the cutting surface on one side of the longitudinal axis of the drill is greater than the area of the cutting surface on the other side of the longitudinal axis.

3. A boring drill comprising a head provided with approximately frusto-conical-shaped cutting rollers whose axes of rotation are inclined downwardly and inwardly toward the longitudinal axis of the head in such a manner that they form a hole concentric with the longitudinal axis of the drill, and means on one side of said head for enlarging the hole formed by said rollers.

4. A boring drill comprising a head, an approximately frusto-conical-shaped cutting device arranged on one side of the longitudinal axis of the drill, and an approximately frusto-conical-shaped cutting means of greater length and diameter arranged on the opposite side of the longitudinal axis of the drill, the axes of rotation of said devices being inclined downwardly and inwardly toward the vertical center of the head.

5. A boring drill comprising a head provided with spindles that incline downwardly and inwardly toward the longitudinal axis of the head, approximately frusto-conical-shaped cutting rollers on said spindles that form a hole concentric with the vertical axis of the drill, and an approximately frusto-conical-shaped cutting device of greater diameter than said rollers arranged in alinement with one of said rollers at the base end of same for enlarging the hole formed by said rollers.

6. A boring drill comprising a head, spindles on said head that project downwardly and inwardly toward the longitudinal axis of the head, approximately frusto-conical-shaped cutting rollers on said spindles which lie on opposite sides of the longitudinal axis of the head, and an independent approximately frusto-conical-shaped cutting roller of greater diameter that projects laterally from one side of the head and whose axis of rotation is in longitudinal alinement with the axis of rotation of one of the rollers first-mentioned.

7. A roller boring drill comprising a head, an inclined roller-supporting means on said head that projects downwardly and inwardly toward the longitudinal axis of the head, two approximately frusto-conical-shaped cutting rollers arranged on said means one behind the other, and an oppositely inclined tapered cutter arranged diametrically opposite said rollers and having a cutting surface of much less area than the combined surfaces of said rollers.

8. A roller boring drill comprising a head, an inclined roller-supporting means on said head that projects downwardly and inwardly toward the longitudinal axis of the head, two approximately frusto-conical-shaped cutting rollers arranged on said means one behind the other, the outer roller operating to retain the other roller in position, means for preventing said outer roller from becoming displaced, and a tapered cutter disposed oppositely to said outer roller and having approximately the same cutting area as said outer roller.

In testimony whereof I hereunto affix my signature in the presence of two witnesses, this 6th day of February, 1913.

HOWARD ROBARD HUGHES.

Witnesses:
   C. E. REED,
   SADE EPSTEIN.